United States Patent
Ozeki et al.

(10) Patent No.: US 7,290,629 B2
(45) Date of Patent: Nov. 6, 2007

(54) POWER UNIT STRUCTURE FOR HYBRID VEHICLE

(75) Inventors: Takashi Ozeki, Saitama (JP); Yoshiaki Tsukada, Saitama (JP); Yutaka Inomoto, Saitama (JP); Kazumi Shibata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 287 days.

(21) Appl. No.: 10/924,950

(22) Filed: Aug. 25, 2004

(65) Prior Publication Data

US 2005/0067201 A1 Mar. 31, 2005

(30) Foreign Application Priority Data

Sep. 29, 2003 (JP) .............................. 2003-338823
Sep. 29, 2003 (JP) .............................. 2003-338824
Sep. 29, 2003 (JP) .............................. 2003-338825

(51) Int. Cl.
*B60K 6/02* (2006.01)
(52) U.S. Cl. ...................... 180/65.2; 903/951
(58) Field of Classification Search .............. 180/65.2, 180/65.3, 65.4, 220, 908; 903/951, 952
See application file for complete search history.

(56) References Cited

U.S. PATENT DOCUMENTS

| | | | |
|---|---|---|---|
| 4,372,415 A | | 2/1983 | Watanabe et al. |
| 5,613,569 A | * | 3/1997 | Sugioka et al. ............ 180/68.5 |
| 5,667,029 A | | 9/1997 | Urban et al. |
| 6,155,366 A | * | 12/2000 | Lin ........................... 180/65.2 |
| 6,218,804 B1 | * | 4/2001 | Toriyama et al. ........... 320/104 |
| 6,269,895 B1 | * | 8/2001 | Tanuguchi et al. ......... 180/65.2 |
| 2003/0092525 A1 | | 5/2003 | Gu et al. |

FOREIGN PATENT DOCUMENTS

| | | |
|---|---|---|
| EP | 0 445 873 A1 | 9/1991 |
| EP | 0 758 050 A1 | 2/1997 |
| EP | 1 270 302 A2 | 1/2003 |
| JP | 8-175473 A | 7/1996 |
| JP | 8-175477 A | 7/1996 |
| JP | 2000-103384 * | 4/2000 |
| JP | 2002-181147 A | 6/2002 |
| WO | WO 2004/054836 A1 | 7/2004 |

OTHER PUBLICATIONS

Patent Abstracts of Japan, vol. 1996, No. 11, Nov. 29, 1996.

* cited by examiner

*Primary Examiner*—Frank Vanaman
(74) *Attorney, Agent, or Firm*—Birch, Stewart, Kolasch & Birch, LLP (57) ABSTRACT

To provide desired shaft torque to a drive wheel without increasing the number of parts or increasing the size of a motor, to improve cooling capability of a generator housed inside a transmission case, and to improve energy transmission efficiency and electrical generation efficiency in an engine unit of a hybrid vehicle. A power unit structure for a hybrid vehicle is provided with an engine, a continuously variable transmission, a driven shaft, a drive motor and a reduction gear mechanism. The drive motor is attached to the reduction gear mechanism.

15 Claims, 5 Drawing Sheets

POWER UNIT STRUCTURE FOR HYBRID VEHICLE

CROSS-REFERENCE TO RELATED APPLICATIONS

This nonprovisional application is related to Japanese Patent Application Nos. 2003-338823, 2003-338824 and 2003-338825, each filed on Sep. 29, 2003. The entirety of each of the above documents is incorporated herein by reference.

BACKGROUND OF THE INVENTION

1. Field of the Invention:

The present invention relates to a power unit structure for a hybrid vehicle, having an engine and a motor as drive power sources.

2. Description of Background Art:

In the background art, a known hybrid vehicle has power transmission means for transmitting power from an engine to a drive wheel housed inside a transmission case. The power transmission means combines and transmits power from the engine and power from a motor to a drive shaft (see, for example, Japanese patent laid-open No. Hei. 8-175473). The hybrid vehicle disclosed in the above document has a generator connected directly or though a reduction gear to a driven shaft of the power transmission means.

However, when a requested shaft torque is supplied to the drive wheel, with the above-described configuration having the motor connected via a reduction gear to the driven shaft of the power transmission means, a need arises to provide an additional reduction gear independent from the first reduction gear. In addition, with the above-described configuration where the motor is directly connected to the driven shaft of the power transmission means, it is difficult to ensure a sufficient reduction ratio from the motor to the drive wheel. Therefore, there is a problem in that the motor is increased in size.

The hybrid vehicle disclosed in the above patent document also has the drive wheel connected to the drive shaft projecting in a widthwise direction of the vehicle from the unit case, and a generator is connected to an outer side in the widthwise direction of the vehicle. Therefore, the thickness around the drive shaft becomes wide.

To deal with this, it has been considered to house the generator inside the unit case to make efficient use of space. However, the generator of a hybrid vehicle supplies traveling force to the drive shaft. Therefore, a rated output normally becomes large, and the amount of heat generated also becomes large. Therefore, since the width around the drive shaft is narrowed, when the generating motor is housed inside the power unit it is desirable to improve cooling capability of the generating motor.

In the background art, a vehicle provided with, for example, a belt type continuously variable transmission as power transmission means for transmitting power from an engine to a drive wheel is known (see, for example, Japanese patent application No. 2002-181147). The vehicle disclosed in this document is configured with a centrifugal starter clutch connected to a crankshaft of an engine. If the rotational speed of the engine exceeds a specified value, the starter clutch is engaged to rotate the belt type continuously variable transmission. In addition, engine power is transmitted to the drive wheel through the belt type continuously variable transmission. Specifically, until the rotational speed of the engine exceeds a specified value, the belt type continuously variable transmission does not rotate, giving the effect of lowering friction.

However, the vehicle disclosed in the above-described patent document is normally a motorcycle, and not a hybrid vehicle where engine power and motor power are combined and transmitted to the drive wheel side. In a hybrid vehicle, there are cases where a drive wheel is driven with only a motor as a power source. It is desirable to improve energy transmission efficiency in this type of case. Also, in the case where rotational speed of the engine is low, such as when idling, it is desirable to use a rotational force of the crankshaft efficiently, and to generate electricity with the motor functioning as a starter motor and a generator.

SUMMARY OF THE INVENTION

The present invention has been conceived in view of the above-described problems, and an object of the present invention is to provide a desired shaft torque to a drive wheel without increasing the number of parts or increasing the size of a motor.

In order to solve the above described problems, an aspect of the present invention is directed to a power unit structure for a hybrid vehicle, provided with an engine (for example, an engine 20 in an embodiment that will be described later), power transmission means (for example, a continuously variable transmission 23 in an embodiment that will be described later) for transmitting rotational force of a crankshaft (for example, a crankshaft 22 in an embodiment that will be described later) connected to the engine to a drive wheel (for example, a rear wheel WR in an embodiment that will be described later) side, a driven shaft (for example, a driven shaft 60 connected to the rear wheel WR via a reduction gear mechanism 69 in an embodiment that will be described later) connected to a driven side of the power transmission means, a reduction gear mechanism (for example, a reduction gear mechanism 69 in an embodiment that will be described later) for reducing rotational force of the driven shaft and transmitting to the drive wheel, and a motor (for example, a drive motor 21b in an embodiment that will be described later) for transmitting power to the drive wheel, wherein the motor is attached to the reduction gear mechanism.

According to this type of structure, it is possible to reduce and transmit power from the motor to the drive wheel using the reduction gear mechanism provided between the power transmission means and the drive wheel.

According to another aspect of the present invention the power unit structure for a hybrid vehicle includes the motor connected to the driven shaft.

According to a further aspect of the present invention, the power unit for a hybrid vehicle includes the motor arranged at a side opposite to the reduction gear mechanism sandwiching the power transmission means. With this type of structure, the motor and reduction gear mechanism, which are heavy, are divided in a widthwise direction (to the left and right) of the power transmission mechanism.

According to another aspect of the present invention, the power unit structure for a hybrid vehicle includes the hybrid vehicle being a unit swing type two-wheeled vehicle, and the motor is arranged further up than a line connecting the crank shaft and the drive wheel (for example, a line L connecting the crankshaft 22 and the axle 68 in an embodiment that will be described later), looking from the side of the vehicle. With this type of structure, it is possible to position a generating motor of a hybrid vehicle that is likely to be large higher up.

According to another aspect of the present invention, the power unit for a hybrid vehicle includes the motor being arranged at an outer side in the widthwise direction of the vehicle with respect to the power transmission means. With this type of structure, the motor is exposed to the outside simply by opening the transmission case holding the power transmission means.

According to a further aspect of the present invention, the power unit structure for a hybrid vehicle includes the longitudinal direction of an output shaft of the motor being oriented in the widthwise direction of the vehicle, and the motor output shaft is arranged further to the front of the vehicle than the drive shaft. With this type of structure, it is possible to make the length of the vehicle in the longitudinal direction short.

According to the above aspects of the present invention, it is possible to reduce and transmit power from the motor to the drive wheel using the reduction gear mechanism provided between the power transmission means and the drive wheel, which means it is possible to obtain the following effects compared to a power unit where the motor is connected directly to the drive wheel and a reduction gear mechanism is not provided between the power transmission means and the drive wheel. Specifically, although generated power of the drive motor 21b is the same in both situations, even in cases where the speed must be finally reduced together, since it is not necessary to add a new reduction gear mechanism between the power transmission means and the drive wheel, it is possible to prevent an increase in the number of parts. On the other hand, when power finally transmitted to the drive wheel is shared, it is possible to further reduce the size of the motor.

In addition, the motor and reduction gear mechanism, which are heavy, are divided in a widthwise direction (to the left and right) of the power transmission mechanism. Furthermore, since it is possible to position a generating motor of a hybrid vehicle that is likely to be large higher up, it is possible to ensure a larger bank angle for a two-wheeled vehicle. In addition, since the motor is exposed to the outside simply by opening the transmission case holding the power transmission means, it is possible to improve maintainability and attachability of the motor. Furthermore, it is possible to make the length of the vehicle in the longitudinal direction short.

Another object of the present invention is to improve the cooling ability of the generator housed inside the unit case.

In order to solve this problem, an aspect of the present invention is directed to a power unit (for example a power unit 11 in an embodiment that will be described later) for a hybrid vehicle, provided with an engine (for example, an engine 20 in an embodiment that will be described later), power transmission means (for example, a continuously variable transmission in an embodiment that will be described later) for transmitting rotational force of a crankshaft (for example, a crankshaft 22 in an embodiment that will be described later) connected to the engine to a drive wheel (for example, a rear wheel WR in an embodiment that will be described later) side, a drive shaft connected to a driven side of the power transmission means and also connected to the drive wheel (for example, a driven shaft 60 connected to the rear wheel via a reduction gear mechanism 69 in an embodiment that will be described later), a motor (for example, a motor 21b in an embodiment that will be described later) connected to the drive shaft and functioning as at least an electrical generator, and a unit case (for example, a transmission case 59 in an embodiment that will be described later) for housing the power transmission means and the motor, wherein a fan (for example, a fan 54b in an embodiment that will be described later) connected to the crankshaft is provided, and the motor and the fan are arranged inside the unit case together at the same side with respect to the power transmission means. With this type of structure, the fan rotates together with the crankshaft, and swirling current is generated inside the unit case as a result of this rotation.

According to another aspect of the present invention, the power unit for a hybrid vehicle includes power engage/disengage means (for example, a starter clutch 40 in an embodiment that will be described later) for transmitting rotation force of the crankshaft to the power transmission means when a rotational speed of the crankshaft exceeds a specified value. The power engage/disengage means is provided between the crankshaft and the power transmission means. With this type of structure, even during idle rotation waiting for traffic signals etc., since the power transmission means is not driven it is possible to suppress the generation of friction.

According to a further aspect of the present invention, the power unit for a hybrid vehicle includes the motor being attached to the unit case. With this type of structure, heat generated from the motor is conveyed to the unit case and dissipated from an outer surface of the case.

According to another aspect of the present invention, the power unit for a hybrid vehicle includes the motor being attached to an inner wall (for example, an inner wall 59A in an embodiment that will be described later) of the unit case. With this type of structure, the motor is not only cooled by traveling wind, but is also cooled by swirling current generated inside the unit case by the fan.

According to an additional aspect of the present invention, the power unit for a hybrid vehicle includes cooling fins (for example fins 59b in an embodiment that will be described later) provided on a motor attachment section outer surface (for example, an outer wall 59B in an embodiment that will be described later) of the unit case. With this type of structure, the surface area of the motor attachment section outer surface, constituting a heat-dissipating surface, is increased, and cooling capability using traveling wind is further improved.

According to the above aspects of the present invention, the fan rotates together with the crankshaft, and swirling current is generated inside the unit case as a result of this rotation, which means that it is possible to efficiently cool the generating motor that generates a lot of heat. It is also possible to forcibly control the motor, even when there is no traveling wind such as at the time of idling when waiting for traffic signals or the like.

Furthermore, even during idle rotation waiting for traffic signals etc., since the power transmission means is not driven, it is possible to suppress the generation of friction. In addition, heat generated from the motor is conveyed to the unit case and dissipated from an outer surface of the case, which means that it is possible to increase cooling efficiency of the motor using traveling air. Furthermore, since the motor is not only cooled by traveling wind, but is also cooled by swirling current generated inside the unit case by the fan, it is possible to more efficiently cool the motor. In addition, since the surface area of the motor attachment section outer surface, constituting a heat-dissipating surface, is increased, cooling capability using traveling wind is further improved, and it is possible to much more efficiently cool the motor.

An additional object of the present invention is to improve energy transmission efficiency and to improve electrical generation efficiency in an engine unit of a hybrid vehicle.

In order to solve the above described problems, a power unit for a hybrid vehicle is provided with an engine (for example, an engine 20 in an embodiment that will be described later), a first motor (for example, an ACG starter motor 21a in an embodiment that will be described later) connected to a crankshaft (for example, a crankshaft 22 in an embodiment that will be described later) of the engine and functioning as a starter motor and an electrical generator, power transmission means (for example, a continuously variable transmission 23 in an embodiment that will be described later) for transmitting rotational force of the crankshaft to a drive wheel (for example, a rear wheel WR in an embodiment that will be described later) side, a drive shaft connected to a driven side of the power transmission means and also connected to the drive wheel (for example, a driven shaft 60 connected to the rear wheel WR via a reduction gear mechanism 69 in an embodiment that will be described later), a second motor (for example, a drive motor 21b in an embodiment that will be described later) connected to the drive shaft and functioning at least as a motor, and power engage/disengage means (for example, a starter clutch 40 in an embodiment that will be described later), provided between the crankshaft and the power transmission means, for transmitting rotational force of the crankshaft to the power transmission means when the rotational speed of the crankshaft exceeds a specified value.

According to this type of structure, power transmission between the crankshaft and the power transmission means is disengaged when the rotational speed of the engine falls below the specified value, and instead of drive wheel drive by the engine it becomes possible to drive the drive wheel using a motor (second motor) that generally has a large torque at low rotation. Also, when rotational speed of the engine is low, such as when idling etc., rotational force of the crankshaft is not consumed by drive of the power transmission means but is efficiently converted to electrical energy by first motor. Also, since the power transmission means is not driven when waiting for traffic signals etc., it is possible to suppress the generation of friction.

According to a further aspect of the present invention, the power unit for a hybrid vehicle includes the power engage/disengage means being arranged further outward, in a widthwise direction of the vehicle, than the power transmission means. With this type of structure, the power engage/disengage means is exposed to the outside simply by opening the transmission case holding the power transmission means.

According to another aspect of the present invention, the power unit structure for a hybrid vehicle includes air intake ports (for example, cooling air intake ports 59a in an embodiment that will be described later) provided in a transmission case (for example, a transmission case 59 in an embodiment that will be described later) housing the power transmission means, and the power engage/disengage means is arranged close to the air intake ports. According to this type of structure, the power engage/disengage means is efficiently force cooled using external air that has been taken in to the inside of the transmission case from the air intake ports.

According to another aspect of the present invention, the power unit structure for a hybrid vehicle includes the power engage/disengage means and the second motor arranged at an opposite side to the first motor, enclosing the power transmission means. With this type of structure, the power engage/disengage means and second motor arranged together on the same side with respect to the power transmission means, and the first motor, which is heavy compared to the power engage/disengage means and second motor, are divided in the widthwise direction (left-right) of the vehicle enclosing the power transmission means.

According to the above aspects of the present invention, the power transmission between the crankshaft and the power transmission means is disengaged when the rotational speed of the engine falls below the specified value, and instead of drive wheel drive by the engine it becomes possible to drive the drive wheel using a motor (second motor) that generally has a large torque at low rotation. Therefore, it is possible to reduce drive loss in a low rotation speed region. Also, because when rotational speed of the engine is low, such as when idling etc., rotational force of the crankshaft is not consumed by drive of the power transmission means but is efficiently converted to electrical energy by first motor, electricity generation efficiency by the first motor is improved. Also, since the power transmission means is not driven when waiting for traffic signals etc., it is possible to suppress the generation of friction.

In addition, the power engage/disengage means is exposed to the outside simply by opening the transmission case holding the power transmission means. Therefore, it is possible to improve maintainability and also improve attachability. Also, the power engage/disengage means and the second motor are arranged at the same side with respect to the power transmission means. Therefore, it is possible to reduce the width in the widthwise direction of the vehicle compared to the case where the power engage/disengage means and the second motor are arranged on the other side enclosing the power transmission means.

Furthermore, the power engage/disengage means is efficiently force cooled using external air that has been taken in to the inside of the transmission case from the air intake ports. Therefore, it is possible to improve cooling capability of the power engage/disengage means. In addition, the power engage/disengage means and second motor arranged together on the same side with respect to the power transmission means, and the first motor, which is heavy compared to the power engage/disengage means and second motor, are divided in the widthwise direction (left-right) of the vehicle enclosing the power transmission means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now we described with reference to the accompanying drawings, wherein the same or similar elements have been identified by the same reference numeral throughout the several views. In the following description, front side refers to the advancing direction of the vehicle, and right side and left side refer to the right side and the left side facing in the advancing direction of the vehicle.

Figure 1:
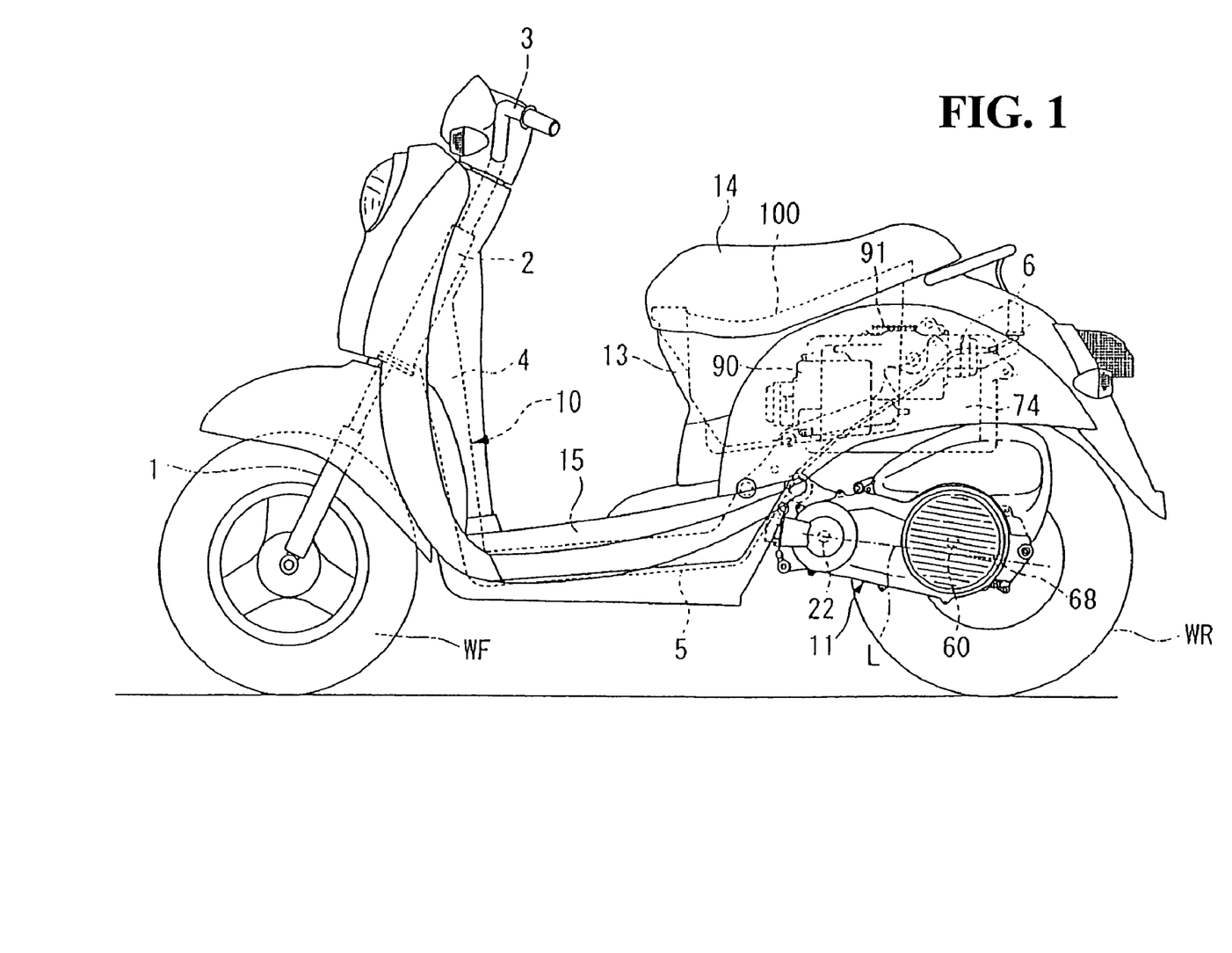
FIG. 1 is a side elevation of a hybrid two-wheeled vehicle provided with a power unit of the present invention.

As shown in FIG. 1, a hybrid vehicle according to an embodiment of the present invention is a unit swing type two-wheeled vehicle, having a front fork 1 where a front wheel WF is axially supported at the front of the vehicle. The front fork 1 is pivoted on a head pipe 2, and can be steered by operating a handle 3. A downpipe 4 running to the rear and down is attached from the head pipe 2. A middle frame 5 extends substantially horizontally from a lower end of the down pipe 4. Furthermore, a rear frame 6 is formed running rearwards and upwards from a rear end of the middle frame 5. One end of a power unit 11, as a drive power source, is pivoted to the vehicle frame 10 constructed in this way.

This power unit 11 has a rear wheel WR, that is a drive wheel, rotatably attached to another rearward end, and is suspended from a rear cushion attached to the rear frame 6, which means that a swingable unit swing type is constituted with the pivoted section as a center. Also, the outer periphery of the vehicle frame 10 is covered by a vehicle cover 13, with a seat 14 for a rider to sit on being fixed to the rear and on an upper surface of the vehicle cover 13. A step floor for the rider to place their feet on is formed further forward than the seat 14. A storage box 100 functioning as utility space for storing a helmet or luggage is provided below the seat 14.

Figure 2:
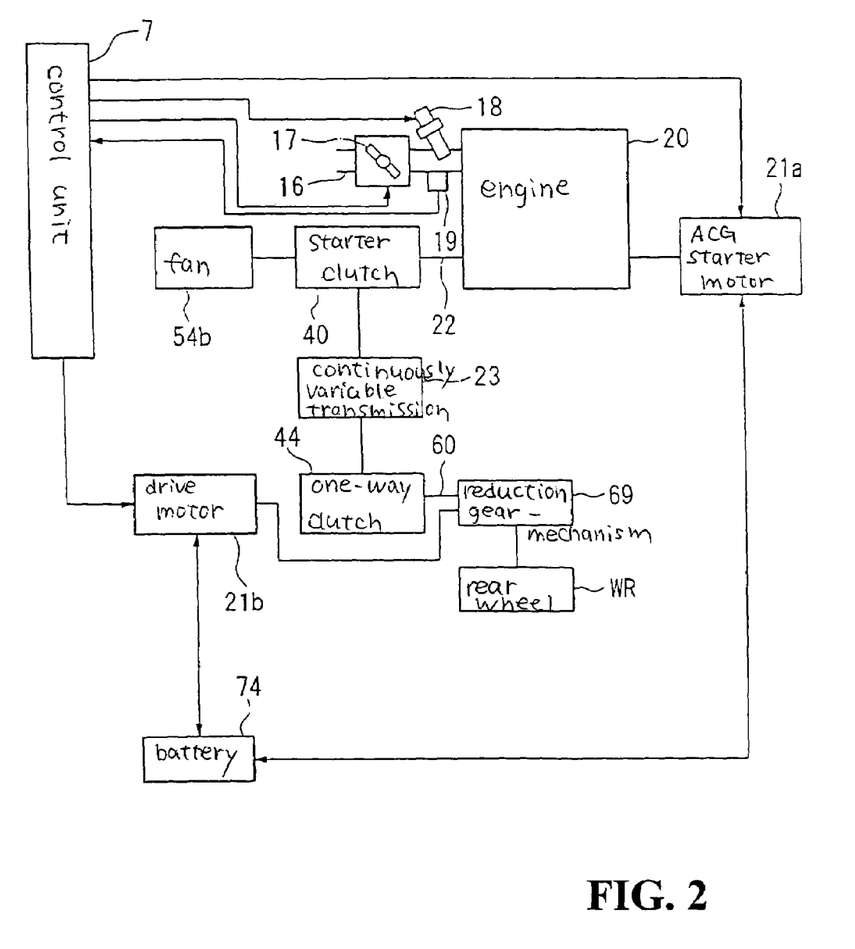
FIG. 2 is a block diagram showing the system structure of the two-wheeled vehicle shown in FIG. 1.

As shown in FIG. 2, the power unit 11 includes an engine 20, being an internal combustion engine obtaining output by combusting an inflammable fuel air mixture. An ACG starter motor 21a is provided to function as a starter motor and an electrical generator. A continuously variable transmission (power transmission means) 23 is connected to a crank shaft 22 for transmitting a drive force from the engine 20 to the rear wheel WR, which is a drive wheel. A starter clutch (power engage/disengage means) 40 is provided for engaging and disengaging a drive force transmission between the crank shaft 22 and a drive side of the continuously variable transmission. A drive motor 21b is provided to function as a motor or an electrical generator. A one-way clutch 44 is provided for transmitting a drive force from the engine 20 and drive motor (motor) 21b to the rear wheel WR, but not transmitting force from the rear wheel WR to the engine 20. A reduction gear mechanism is provided for reducing an output from the continuously variable transmission 23 and transmitting the output to the rear wheel WR.

A drive force from the engine 20 is transmitted from the crank shaft 22 through the starter clutch 40, infinitely variable transmission 23, one-way clutch 44, driven shaft (drive shaft) 60 and reduction gear mechanism to the rear wheel WR. On the other hand, a drive force form the drive motor 21b is transmitted to the rear wheel WR through the driven shaft 60 and the reduction gear mechanism. Specifically, the driven shaft 60 of the infinitely variable transmission 23, constituting a drive shaft for the rear wheel WR via the reduction gear mechanism 69, doubles as a motor output shaft of the drive motor 21b.

A battery 74 is connected to the ACG starter motor 21a and the drive motor 21b. When the drive motor 21b functions as a motor and the ACG starter motor 21a functions as a starter, the battery 74 supplies electrical power to the motors 21a and 21b. However, when the ACG starter motor 21a and the drive motor 21b are functioning as electrical generators, the electrical power they generate is used to recharge the battery. Control of the engine 20, ACG starter motor 21a and the drive motor 21b are performed by a control unit 7, being control means.

The engine 20 has a structure for taking in and combusting a fuel air mixture made up of air from an intake pipe 16 and fuel. A throttle valve 17 for controlling the amount of air is provided inside the intake pipe in a rotatable manner. The throttle valve 17 rotates according to the extent of operation of a throttle grip (not shown in the drawing) operated by the rider. An injector 18 for jetting fuel and a negative pressure sensor 19 for detecting negative pressure inside the intake pipe are arranged between the throttle valve 17 and the engine 20. If the throttle grip is operated a lot, the throttle valve 17 opens a large amount, and a large amount of air flows through, and the intake pipe negative pressure detected by the negative pressure sensor 19 is small. Accompanying this, the air amount and fuel amount taken into the engine 20 is increased. On the contrary, if the throttle grip is operated only slightly, the throttle valve 17 opens a small amount, and a small amount of air flows through, and the intake pipe negative pressure detected by the negative pressure sensor 19 is large. Accompanying this, the air amount and fuel amount taken in by the engine 20 is reduced.

Figure 3:
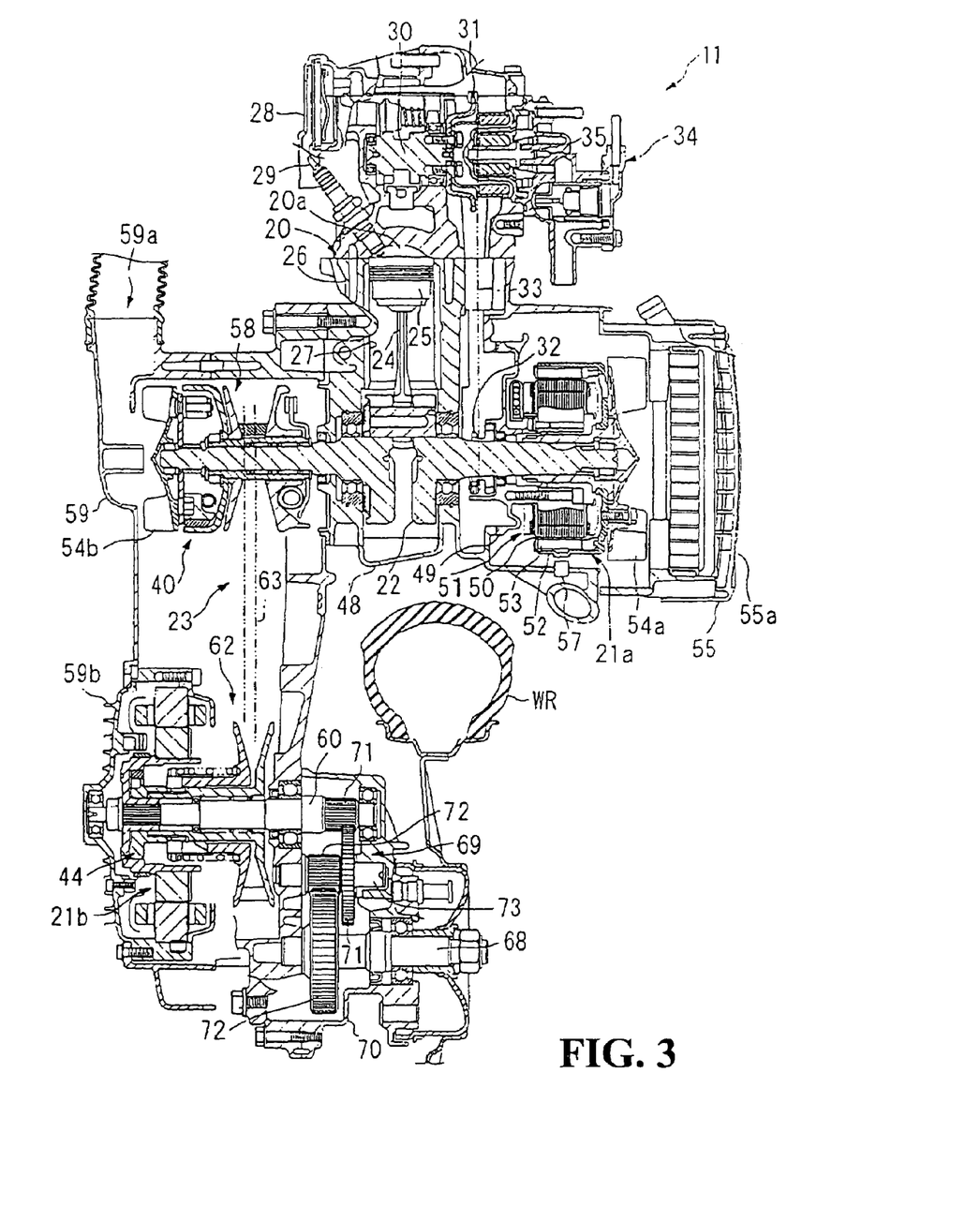
FIG. 3 is a cross sectional view of the power unit shown in FIG. 1.

With reference to FIG. 3, one embodiment of a power unit 11 including the engine 20 and the drive motor 21b will be described. The engine 20 is provided with a piston 25 connected via a connecting rod 24 to the crankshaft 22. The piston 25 is capable of reciprocating inside a cylinder 72 provided in a cylinder block 26. The cylinder block 26 is arranged so that the axis of the cylinder 27 is substantially horizontal. Also, a cylinder head 28 is fixed to the front surface of the cylinder block 26, and a combustion chamber 20a for combustion of the fuel air mixture is formed by the cylinder head 28, cylinder 27 and piston 25.

Valves (not shown) for controlling intake or exhaust of the fuel air mixture to and from the combustion chamber 20a, and a spark plug 29, are provided in the cylinder head 28. Opening and closing of the valves is controlled by rotation of a cam shaft 30 pivoted in the cylinder head 28. The cam shaft 30 has a driven sprocket 31 on one end, with a continuous cam chain 33 wound between the driven sprocket 31 and a drive sprocket 23 provided on one end of the cranks shaft 22. As a result, the cam shaft 30 is coupled to rotation of the cranks shaft 22, and can be caused to rotate. A water pump 34 for cooling the engine 20 is also provided on one end of the cam shaft 30. The water pump 34 is attached so that a rotation shaft 35 rotates integrally with the cam shaft 30. Therefore, if the cam shaft is rotated, the water pump 34 can be activated.

A stator case 49 is connected to a left side, in the vehicle width direction, of the crankcase 48 pivotally supporting the crankshaft 22, and the ACG starter motor 21a is housed inside the stator case 49. The ACG starter motor 21a is a so-called outer rotor type motor. A stator of the motor is constituted of a coil 51 having conducting wires wound around teeth 50 fixed to the stator case 49. On the other hand, an outer rotor 52 is fixed to the crank shaft 22, and has a substantially cylindrical shape covering the outer periphery of the stator. A magnet 53 is also arranged on an inner surface of the outer rotor 52. A fan 54a for cooling the ACG starter motor 21a is attached to the outer rotor 52. If the fan 54a is rotated in synchronism with the crank shaft 22, air for cooling is taken in from a cooling air intake port formed in a side surface 55a of the cover 55 of the stator case 49.

A transmission case (unit case) 59 is connected to a left side, in the width direction of the vehicle, of the crankcase 48. The transmission case 59 holds a fan 54b fixed to a left end of the crank shaft 22, an infinitely variable transmission 23 having a drive side connected to the crank shaft 22 via the starter clutch 40, and a drive motor 21b connected to a driven side of the continuously variable transmission 23.

The fan 54b is for cooling the continuously variable transmission 23 and the drive motor 21b housed in the transmission case 59, and is arranged at the same side as the drive motor 21b, with respect to the continuously variable transmission 23, that is in this embodiment, at the left side in the width direction of the vehicle. The cooling air intake port 59a is formed at a vehicle body front side and left side of the transmission case 59. If the fan 54b rotates in synchronism with the crank shaft 22, external air is taken in to the inside of the transmission case 59 from the cooling air intake port 59a positioned close to the fan 54b to forcibly cool the drive motor 21b and the continuously variable transmission 23.

Figure 5:
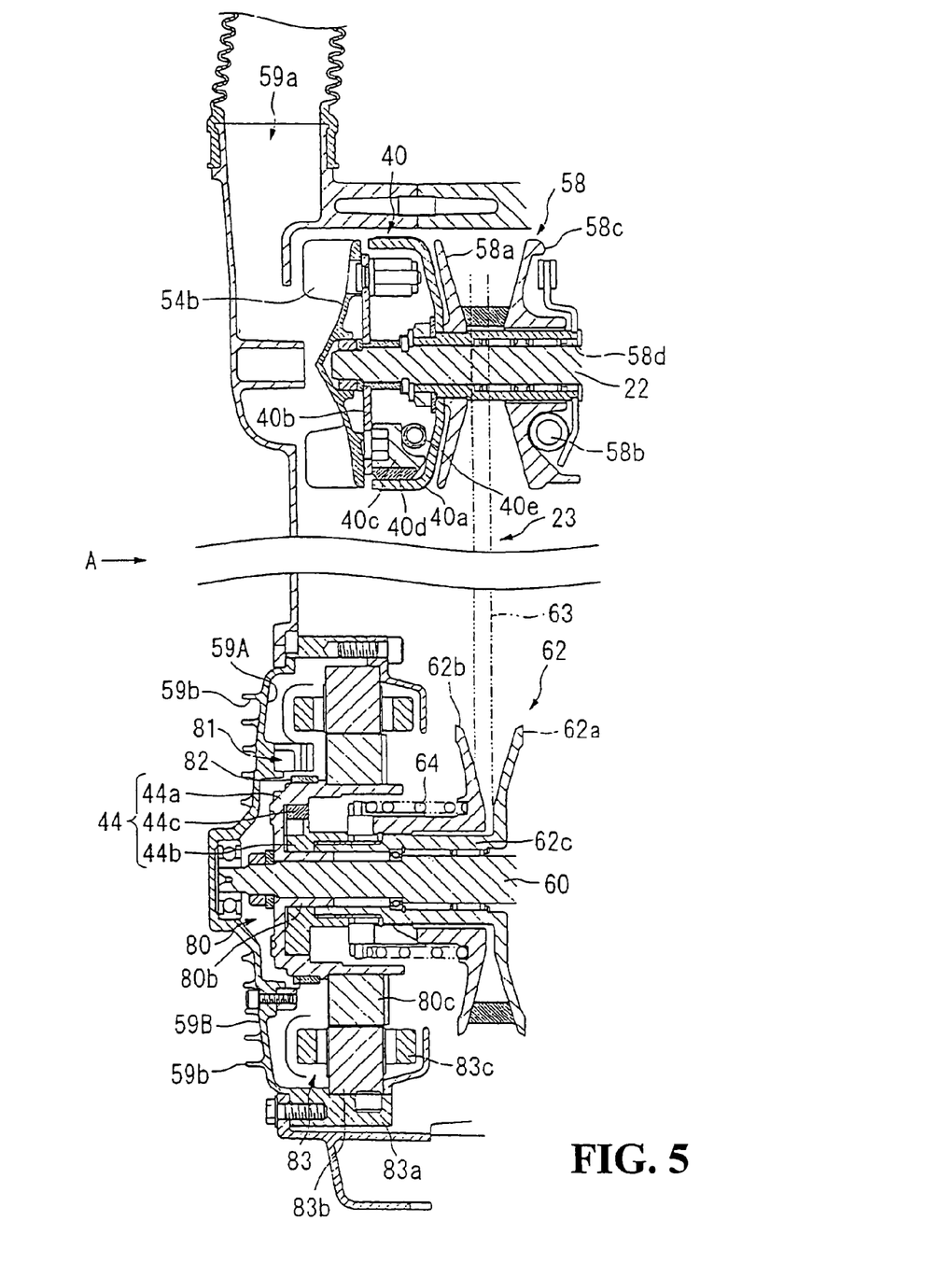
FIG. 5 is an enlarged view of main parts of FIG. 3.

The continuously variable transmission 23 has a belt converter constituted by an endless V-belt 63 wound between a drive side transmission pulley mounted via the starter clutch 40 to a left end of the crank shaft 22 protruding from the crankcase in a widthwise direction of the vehicle, and a driven side transmission pulley 62 mounted via the one way clutch 44 to the driven shaft 60 pivotally supported on the transmission case holding an axial line parallel to the crank shaft. The drive side transmission pulley 58, as shown in enlarged form in FIG. 5, is mounted so as to rotate in a circumferential direction with respect to the crank shaft 22, via a sleeve 58d, and is made up of a drive side fixed pulley half body 58a that is fixed on the sleeve 58d, and a drive side movable pulley half body 58c that is attached so as to be capable of sliding in an axial direction with respect to the sleeve 58d, but is incapable of rotation in the circumferential direction.

On the other hand, the driven side transmission pulley 62 is comprised of a driven side fixed pulley half body 62a attached so that sliding in the axial direction with respect to the driven shaft 60 is restricted but capable of rotation in the circumferential direction, and a driven side movable pulley half body 62b attached on a boss section 62c of the driven side fixed pulley half body 62a capable of sliding in the axial direction. The endless V-belt 63 is then wound in belt grooves having a V-shaped cross section that are respectively formed between the drive side fixed pulley half body 58a and the drive side movable pulley half body 58c, and between the driven side fixed pulley half body 62a and the driven side movable pulley half body 62b. A spring 64 for normally urging the driven side movable pulley half body 62b towards the driven side fixed pulley half body 62a is arranged on a rear surface side (left side in the width direction of the vehicle) of the driven side movable pulley half body 62b.

In this structure, if the rotational speed of the crank shaft 22 rises, for the drive side transmission pulley 58, centrifugal force acts on a weight roller 58b and the drive side movable pulley half body 58c slides to the drive side fixed pulley half body 58a side. The drive side movable pulley half body 58c moves closer to the drive side fixed pulley half body 58a by the extent of the sliding. Since the groove width of the drive side transmission pulley 58 is now reduced, the contact position of the drive side transmission pulley 58c and the V-belt 63 slips to a radially outer side of the drive side transmission pulley 58, so that the diameter the V-belt is wrapped round is increased. Accompanying this, in the driven side transmission pulley 62, the groove width formed by the driven side fixed pulley half body 62a and the driven side movable pulley half body 62b is increased. Specifically, in response to rotational speed of the crankshaft 22, the diameter the V-belt is wrapped around (transmission pitch diameter) varies continuously, and the gear ratio is automatically and continuously varied.

The starter clutch 40 is provided more to the outside of the vehicle body than the continuously variable transmission 23 (in this embodiment the left side in the vehicle width direction) that is, between the drive side fixed pulley half body 58a and the fan 54b, and close to the cooling air intake port 59a formed in the transmission case 59. This starter clutch 40 is provided with a cap shaped outer case 40a fixed to the sleeve 58d, an outer plate 40b fixed to a left end of the crank shaft 22, a shoe 40d attached to an outer edge of the outer plate 40b via a weight 40c so as to face in a radially outer direction, and a spring 40e for urging the show 40d to the radially outer side.

With this structure, if engine speed, that is, rotational speed of the crank shaft 22, is less than a specified value (for example, 3,000 rpm), transmission of the drive force between the crank shaft 22 and the continuously variable transmission 23 is disengaged. If the engine speed rises and the rotational speed of the crank shaft 22 exceeds the specified value, centrifugal force acting on the weight 40c resists the urging force from the spring acting towards the radially inner side, and the weight 40c is moved to the radially outer side, as a result of which the shoe 40d presses the inner peripheral surface of the outer case 40a with a force greater than the specified value. In this way, rotation of the crank shaft 22 is transmitted via the outer case 40a to the sleeve 58d, and the drive side transmission pulley 58 fixed to the sleeve 59 is driven.

The one-way clutch 44 comprises a cup shaped outer clutch 44a, an inner clutch 44b pressed in coaxially with the outer clutch 44a, and a roller 44c enabling transmission of rotational force in only one direction from the inner clutch 44b to the outer clutch 44a. The outer clutch 44a also serves as an inner rotor body of the drive motor 21b, and is the same member as the inner rotor body. Also, the inner periphery of the inner clutch 44b and the left end of the boss section of the driven side fixed pulley half body 62a are spline connected to each other. In this way, the one-way clutch 44 is arranged inside the inner rotor 80 of the drive motor 21b constituting the inner rotor shape, and is also arranged close, in a vehicle width direction, to the spring 64 arranged at the rear surface side (left side in the vehicle width direction) of the driven side movable pulley half body 62b.

In this structure, on the one hand, the drive force from the engine 20 side transmitted to the driven side transmission pulley 62 of the continuously variable transmission 23 is transmitted to the rear wheel WR through the driven side fixed pulley half body 62a, inner clutch 44b outer clutch 44a, namely the inner rotor body, driven shaft 60 and reduction gear mechanism 69. However, on the other hand, the drive force from a rear wheel WR side when pushing the vehicle or at the time of regenerative motion is transmitted up to the reduction gear mechanism 69, driven shaft 60 and inner rotor body, that is, the outer clutch 44a. However, since this outer clutch 44a slips with respect to the inner clutch 44b, there is no transmission to the reduction gear mechanism 23 and the engine 20.

The inner rotor type drive motor 21b, in which the driven shaft 60 is the motor output shaft, is provided at a vehicle rear side of the transmission case 59. That is, the drive motor 21b according to an embodiment of the present invention is attached to the reduction gear mechanism 29 via the driven shaft 60, and the motor output shaft, that is, the driven shaft 60, is arranged so as to be oriented in the vehicle width direction. The inner rotor 80 is comprised of the driven shaft 60, also being the output shaft of the continuously variable transmission 23, the cup shaped inner rotor, namely the inner clutch 44b, spline fitted to the driven shaft using the boss section 80b formed on a central part, and a magnet 80c arranged on an opening side outer surface of the inner clutch 44b. A plurality of elements to be detected that will be detected by a rotor sensor 81 attached to an inner wall 54A of the transmission case 59 are mounted on a bottom side outer surface of the inner clutch 44b. On the other hand, the stator 83 is made up of a coil 86c having conductive wires wound around teeth 83b fixed to the stator case 83a inside the transmission case 59.

Because the drive motor 21b has the above structure, as well as a function as an electric motor when assisting output of the engine 20, it also functions as an electrical generator (generator) for recharging the battery 74 (not shown in FIG. 2) when rotation of the driven shaft is converted to electrical energy. A PWM (Pulse Width Modulation) signal for controlling the drive motor 21b and electrical power at the time of regeneration are input and output to terminals (omitted from the drawings).

Figure 4:
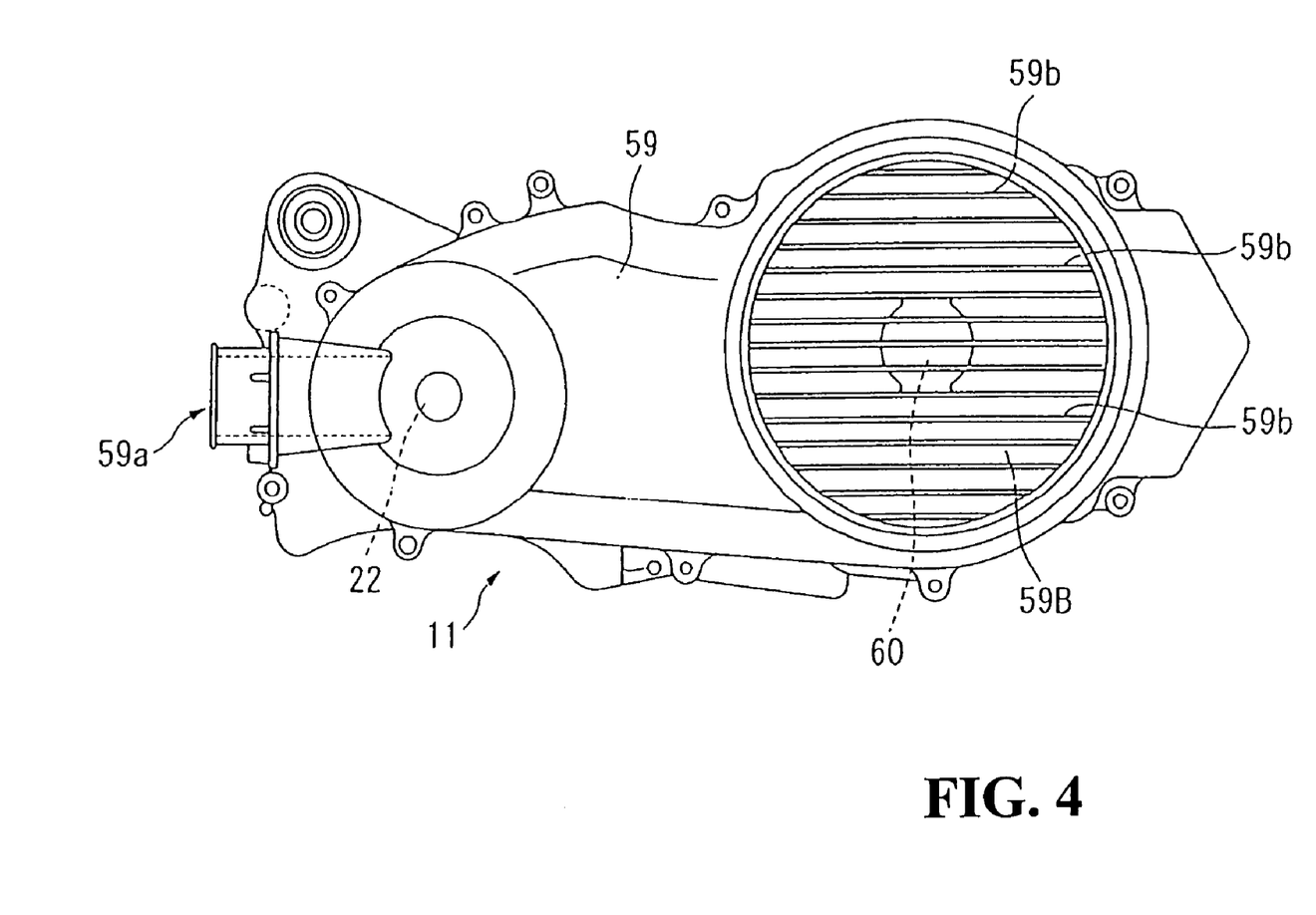
FIG. 4 is an enlarged view of the power unit shown in FIG. 1.

Also, the drive motor 21b is direct-mounted to the inner wall 59A of the cast transmission case 59 via the stator case 83a, and as shown in FIG. 4, a plurality of cooling fins 59b extending to the rear of the vehicle are provided at equal distances from each other on the outer wall 59B (motor attachment section outer surface) of the transmission case 59 corresponding to direct mounting positions. That is, in plan layout, the drive motor 21b is arranged more to the outer side in the vehicle width direction (left side) than the continuously variable transmission, in other words, at an opposite side to the reduction gear mechanism sandwiching the continuously variable transmission. Also, looking at the side of the vehicle in FIG. 1, the drive motor 21b is arranged higher up than a line L connecting the crank shaft 22 and the axle 68 of the rear wheel WR, and further forward than the axle 68. That is, the drive shaft 60, being the output shaft of the drive motor 21b, is positioned higher up than the line L.

The reduction gear mechanism 69 is provided inside the transmission chamber 70 on the rear left side of the transmission case 59. As well as being provided with a middle shaft 73 pivotally supported parallel to the drive shaft 60 and the axle 68 of the rear wheel WR, the reduction gear mechanism 69 is provided with a pair of first reduction gears 71, 71 respectively formed at a right end part of the driven shaft 60 and a central part of the middle shaft 73, and a pair of second reduction gears 72, 72 respectively formed at a right end of the middle shaft 73 and a left end of the axle 68. With this structure, rotation of the driven shaft 60 is reduced at a specified reduction ratio, and transmitted to the axle 68 of the rear wheel WR pivoted parallel to the driven shaft.

The control unit 7 for control of the engine 20, ACG starter motor 21a and the drive motor 21b is control means comprising a CPU (Central Processing Unit), ROM (Read Only Memory), and RAM (Random Access Memory). This control unit 7 receives information from devices such as a throttle opening amount sensor for detecting opening amount of the throttle valve 17, a negative pressure sensor 19, rotor sensors 57, 81 etc. The control unit 7 outputs specified control signals to each of the drivers 90, 91 of the ACG starter motor 21a and the drive motor 21b, and to an ignition device for actuating the spark plugs 29 of the engine 20.

With the hybrid vehicle having the above-described structure, at the time of starting the engine, the crank shaft 22 is caused to rotate using the ACG starter motor 21a on the crank shaft 22. At this time, the starter clutch 40 is not connected, and transmission of a drive force from the crank shaft 22 to the continuously variable transmission 23 is disengaged. Then, in synchronism with rotation of the crank shaft 22, a fuel air mixture taken in to the inside of the cylinder 72 is combusted by the spark plug, and the piston 25 is caused to reciprocate. Then, according to the operation amount of the throttle grip, if the rotational speed of the crankshaft 22 exceeds a specified value (for example, 3000 rpm), a rotational force of the crankshaft 22 is transmitted via the starter clutch 40 to the continuously variable transmission 23, one-way clutch 44 and reduction gear mechanism 69, to drive the rear wheel WR.

At the time of starting, the drive motor 21b is activated due to feed from the battery 74, and it is possible to assist rotation of the driven shaft 60 by engine drive force. Also, instead of starting using the engine 20, it is possible to start using only the drive motor 21b. In this case, rotation of the driven shaft 60 using the drive motor 21b is not transmitted to the driven side transmission pulley 62 because of the one-way clutch 44, and the continuously variable transmission 23 is not driven. In this way, when traveling by driving the rear wheel WR using only the drive motor 21b, energy transmission efficiency is improved.

When traveling using only the engine 20, if the load is large, such as when accelerating or going fast, it is also possible to assist engine travel using the drive motor 21b. At this time, a rotational force of the crank shaft 22 due to reciprocation of the piston 25 is transmitted to the driven shaft 60 via the starter clutch 40, the continuously variable transmission 23 and the one-way clutch 44. In addition, a drive force from the drive motor 21b is also transmitted via the one-way clutch 44, and these combined forces drive the rear wheel WR via the reduction gear mechanism 69. Conversely, when traveling using only the drive motor 21b, it is also possible to assist motor travel using the engine 20.

When traveling at a steady speed (cruise travel) in the case of traveling with only the drive motor 21b as a drive source, if the connected rotation speed of the starter clutch 40 is less than (the above described specified value), even if the engine 20 is operating, the continuously variable transmission 23 is not driven and it is possible to generate electrical power using the ACG starter motor 21a. At the time of this steady speed travel, when traveling with only the drive motor 21b as a drive source, power transmission from the drive motor 21b to the rear wheel WR is carried out without driving the continuously variable transmission, which means that energy transmission efficiency is improved.

At the time of deceleration, the one-way clutch 44, does not transmit rotation of the driven shaft 60 to the driven side transmission pulley 62 of the continuously variable transmission, which means that the continuously variable transmission is not driven and it is possible to regenerate rotation of the axle 68 to the drive motor 21b directly via the reduction gear mechanism. Specifically, at the time of regenerative drive to the drive motor 21b from the rear wheel WR, drive force transmitted from the rear wheel WR to the drive motor 21b is not consumed by the continuously variable transmission 23, and so recharge efficiency at the time of regeneration is improved.

As has been described above, in the hybrid vehicle according to an embodiment of the present invention, the drive motor 21b is attached to the reduction gear mechanism 69, that is, the driven shaft 60. Therefore, it is possible to reduce and transmit power from the drive motor 21b to the rear wheel 69 using the reduction gear mechanism provided between the continuously variable transmission 23 and the rear wheel WR. In view of this, compared to a motor direct type power unit where the drive motor 21b is directly connected to the axle 68 and the reduction gear mechanism is not provided between the continuously variable transmission 23 and the rear wheel WR, the following effects can be obtained. Specifically, although the generated power of the drive motor is the same in both situations, even in cases where speed must be finally reduced, it is not necessary to add a new reduction gear mechanism between the continuously variable transmission 23 and the rear wheel WR, and it is possible to prevent an increase in the number of parts. On the other hand, when power finally transmitted to the rear wheel WR is shared, it is possible to further reduce the size of the drive motor 21b.

In addition to the above-described structure, the drive motor 21b is arranged at the opposite side to the reduction gear mechanism 60 sandwiching the continuously variable transmission 23. Therefore, the drive motor 21b and reduction gear mechanism 69, which are heavy, are divided in a widthwise direction (left-right direction) of the continuously variable transmission 23. The drive motor 21b is arranged higher than the line L connecting the crankshaft 22 and the axle 68, looking from the side of the vehicle. Therefore, the drive motor 21b of a hybrid vehicle, which tends to be large, is positioned higher up, and for a two-wheeled vehicle the drive motor 21b is arranged so that a longitudinal direction of the motor output shaft (driven shaft 60) is oriented in a widthwise direction of the vehicle in order to make it possible to ensure a larger bank angle. Furthermore, since the motor output shaft is arranged further forward than the axle 68, it is possible to shorten the length in a longitudinal direction of the vehicle.

In addition to the above, with this embodiment, by providing the one-way clutch 44 that is capable of transmitting a drive force in one direction from the continuously variable transmission 23 to the driven shaft 60 between the continuously variable transmission 23 and the driven shaft 60, power transmission from the driven shaft 60 side to the engine 20 side is always disengaged. Therefore, when shifting to a regenerative drive to the drive motor 21b from the rear wheel WR, as well as the fact that the above-described disengaging operation is not necessary, since drive force transmitted from the rear wheel WR to the drive motor 21b is not consumed by the continuously variable transmission 23 at the time of regeneration, recharge efficiency is improved. Also, at the time of switching from a state where the drive source is only the engine 20 to a state where the drive source is only the drive motor 21b, since it is no longer necessary to have a drive source switching operation and power transmitted from the drive motor 21b to the rear wheel WR when traveling using only the drive motor 21b is consumed by drive of the continuously variable transmission 23, it is possible to improve energy transmission efficiency. Also, since the one-way clutch 44 is used as unidirectional power transmission means, it is possible to reduce the size of the power unit 11 even if a centrifugal clutch is used.

Since the drive motor 21b is configured as an inner rotor type, and the one-way clutch 44 is arranged at an inner part of the inner rotor 80, it is possible to effectively utilize dead space arising at the inner part even if the inner rotor 80 is unavoidably made large due to specification requirements etc., and it is possible to reduce the size of the power unit 11. Because the continuously variable transmission 23 is arranged close to the spring 64 urging the driven side movable pulley half body 62b in a widthwise direction of the vehicle, it is also possible to make effective use of dead space likely to occur in the vicinity of the spring 64, and it is possible to reduce the size of the power unit 11.

In addition to the above, with this embodiment, the starter clutch 40 is provided between the crankshaft 22 and the continuously variable transmission 23. When the rotational speed of the crank shaft 22 exceeds a specified value, a rotational force of the crankshaft 22 is transmitted to the continuously variable transmission 23, which means that the following effects are obtained. Specifically, since power transmission between the crankshaft 22 and the continuously variable transmission 23 is disengaged when the rotational speed of the engine falls below the specified value, instead of rear wheel dive by the engine 20, it becomes possible to drive the rear wheel using the drive motor 21b that generally has a large torque at low rotation. In this way it is possible to reduce drive loss in a low rotational speed region. Also, when a rotational speed of the engine is low, such as when idling etc., since rotational force of the crankshaft 22 is not consumed by the continuously variable transmission 23, but is efficiently converted to electrical energy by the ACG starter motor 21a, generating efficiency of the ACG starter motor 21a is improved. Since the power transmission means 23 is not driven when waiting for traffic signals etc., it is possible to suppress the generation of friction.

In addition, with this embodiment, due to the fact that the starter clutch 40 and the drive motor 21b are arranged further outwards in a widthwise direction of the vehicle than the continuously variable transmission 23, it is possible to expose the starter clutch 40 and the drive motor 21b to the outside by simply opening the transmission case 59 housing these components. As a result it is possible to improve maintainability and improve attachability. Also, since the starter clutch 40 and the drive motor 21b are arranged at the same side with respect to the continuously variable transmission 23, it is possible to narrow the dimension in the width direction compared to other arrangements as the continuously variable transmission is enclosed. Because the starter clutch 40 is arranged close to the cooling air intake ports 59a formed in the transmission case 59, it is possible to efficiently forcibly cool the starter clutch 40 using external air taken into the transmission case from the cooling air intake ports 59a, and cooling capability of the starter clutch 40 is improved. Since the starter clutch 40 and the drive motor 21b are arranged on the opposite side to the ACG starter motor 21a sandwiching the continuously variable transmission 23, the starter clutch 40 and the drive motor 21b arranged on the same side with respect to the continuously variable transmission 23, and the ACG starter motor 21a which is heavy compared to the starter clutch 40 and the drive motor 21b, are split in a widthwise direction of the vehicle (left-right direction) either side of the continuously variable transmission 23.

In addition, with this embodiment, the fan 54b is connected to the crankshaft 22, and the drive motor 21b and the fan 54b are arranged inside the transmission case 59 at the same side with respect to the continuously variable transmission 23, as a result of which the fan 54b rotates together with the crankshaft 22, and a swirling current is generated inside the transmission case 59 as a result of this rotation. It is therefore possible to efficiently cool the drive motor 21 that has a large heat dissipation. It is also possible to forcibly control the drive motor 21*b*, even when there is no traveling wind such as at the time of idling when waiting for traffic signals or the like. Also, as well as the fact that the drive motor 21*b* is attached to the inner wall 59A of the transmission case 59 and cooling efficiency is improved because heat generated from the drive motor 21*b* is conveyed directly to the case outer surface and cooled by traveling wind, since it is possible to carry out cooling utilizing swirling flow generated inside the transmission case 59 by the fan 54*b*, it is possible to improve cooling capability of the drive motor 21*b*. Also since the cooling fins 59B are provided on the drive motor attachment section outer surface of the transmission case 59, it is possible to further improve the cooling capability using traveling wind.

As has been described above, in the hybrid vehicle according to an embodiment of the present invention, the fan 54*b* is connected to the crankshaft 22, and the drive motor 21*b* and the fan 54*b* are arranged inside the transmission case 59 at the same side with respect to the continuously variable transmission 23. As a result, the fan 54*b* rotates together with the crankshaft 22, and a swirling current is generated inside the transmission case 59 as a result of this rotation. It is therefore possible to efficiently cool the drive motor 21 that has a large heat dissipation. It is also possible to forcibly control the drive motor 21*b*, even when there is no traveling wind such as at the time of idling when waiting for traffic signals or the like. Also, as well as the fact that the drive motor 21*b* is attached to the inner wall 59A of the transmission case 59 and cooling efficiency is improved because heat generated from the drive motor 21*b* is conveyed directly to the case outer surface and cooled by traveling wind, it is possible to carry out cooling utilizing swirling flow generated inside the transmission case 59 by the fan 54*b*. Therefore, it is possible to improve the cooling capability of the drive motor 21*b*. Also, the cooling fins 59B are provided on the drive motor attachment section outer surface of the transmission case 59. Therefore, it is possible to further improve the cooling capability using traveling wind.

In addition to the above, with this embodiment, by providing the one-way clutch 44 that is capable of transmitting a drive force in one direction from the continuously variable transmission 23 to the driven shaft 60 between the continuously variable transmission 23 and the driven shaft 60, power transmission from the driven shaft 60 side to the engine 20 side is always disengaged. Therefore, when shifting to a regenerative drive to the drive motor 21*b* from the rear wheel WR, as well as the fact that the above described disengaging operation is not necessary, a drive force transmitted from the rear wheel WR to the drive motor 21*b* is not consumed by the continuously variable transmission 23 at the time of regeneration. Therefore, recharge efficiency is improved. At the time of switching from a state where the drive source is only the engine 20 to a state where the drive source is only the drive motor 21*b*, it is no longer necessary to have a drive source switching operation. In addition, power transmitted from the drive motor 21*b* to the rear wheel WR when traveling using only the drive motor 21*b* is consumed by drive of the continuously variable transmission 23. Therefore, it is possible to improve energy transmission efficiency. Also, the one-way clutch 44 is used as unidirectional power transmission means. Therefore, it is possible to reduce the size of the power unit 11 even if a centrifugal clutch is used.

The drive motor 21*b* is configured as an inner rotor type, and the one-way clutch 44 is arranged at an inner part of the inner rotor 80. Therefore, it is possible to effectively utilize dead space arising at the inner part even if the inner rotor 80 is unavoidably made large due to specification requirements etc. In addition, it is possible to reduce the size of the power unit 11. The continuously variable transmission 23 is arranged close to the spring 64 urging the driven side movable pulley half body 62*b* in a widthwise direction of the vehicle. Therefore, it is also possible to make effective use of dead space likely to occur in the vicinity of the spring 64, and it is possible to reduce the size of the power unit 11.

In addition to the above, the starter clutch 40 is provided between the crankshaft 22 and the continuously variable transmission 23. When the rotational speed of the crank shaft 22 exceeds a specified value and is transmitted to the continuously variable transmission 23, the following effects are obtained. Specifically, the power transmission between the crankshaft 22 and the continuously variable transmission 23 is disengaged when the rotational speed of the engine falls below the specified value. Therefore, instead of rear wheel drive by the engine 20 it becomes possible to drive the rear wheel using the drive motor 21*b* that generally has a large torque at a low rotation. In this way it is possible to reduce a drive loss in a low rotational speed region. Also, when rotational speed of the engine is low, such as when idling etc., a rotational force of the crankshaft 22 is not consumed by the continuously variable transmission 23 but is efficiently converted to electrical energy by the ACG starter motor 21*a*. Therefore, a generating efficiency of the ACG starter motor 21*a* is improved. In addition, the power transmission means 23 is not driven when waiting for traffic signals etc. Therefore, it is possible to suppress the generation of friction.

In addition, with this embodiment, the starter clutch 40 and the drive motor 21*b* are arranged further outwards in a widthwise direction of the vehicle than the continuously variable transmission 23. Therefore, it is possible to expose the starter clutch 40 and the drive motor 21*b* to the outside by simply opening the transmission case 59 housing these components. As a result it is possible to improve maintainability and improve attachability. Also, the starter clutch 40 and the drive motor 21*b* are arranged at the same side with respect to the continuously variable transmission 23. Therefore, it is possible to narrow the dimension in the width direction compared to other arrangements as the continuously variable transmission is enclosed. In addition, the starter clutch 40 is arranged close to the cooling air intake ports 59*a* formed in the transmission case 59. Therefore, it is possible to efficiently forcibly cool the starter clutch 40 using external air taken into the transmission case from the cooling air intake ports 59*a*, and cooling capability of the starter clutch 40 is improved. Furthermore, the starter clutch 40 and the drive motor 21*b* are arranged on the opposite side to the ACG starter motor 21*a* sandwiching the continuously variable transmission 23. Therfore, the starter clutch 40 and the drive motor 21*b* are arranged on the same side with respect to the continuously variable transmission 23, and the ACG starter motor 21*a* which is heavy compared to the starter clutch 40 and the drive motor 21*b*, are split in a widthwise direction of the vehicle (left-right direction) of the continuously variable transmission 23.

In addition to the above, the drive motor 21*b* is attached to the reduction gear mechanism 69, that is, the driven shaft 60. Therefore, it is possible to reduce and transmit power from the drive motor 21*b* to the rear wheel 69 using the reduction gear mechanism provided between the continuously variable transmission 23 and the rear wheel WR. Therefore, compared to a motor direct type power unit where the drive motor 21*b* is directly connected to the axle 68 and the reduction gear mechanism is not provided between the continuously variable transmission 23 and the rear wheel WR, the following effects can be obtained. Specifically, although generated power of the drive motor 21b is the same in both situations, even in cases where the speed must be finally reduced, it is not necessary to add a new reduction gear mechanism between the continuously variable transmission 23 and the rear wheel WR, and it is possible to prevent an increase in the number of parts. On the other hand, when power finally transmitted to the rear wheel WR is shared, it is possible to further reduce the size of the drive motor 21b.

In addition to the above described structure, the drive motor 21b is arranged at the opposite side to the reduction gear mechanism 60 sandwiching the continuously variable transmission 23. Therefore, the drive motor 21b and reduction gear mechanism 69, which are heavy, are divided in a widthwise direction (left-right direction) of the continuously variable transmission 23. In addition, the drive motor 21b is arranged higher than the line L connecting the crankshaft 22 and the axle 68, looking from the side of the vehicle. Therefore, the drive motor 21b of a hybrid vehicle, which tends to be large, is positioned higher up, and for a two-wheeled vehicle the drive motor 21b is arranged so that a longitudinal direction of the motor output shaft (driven shaft 60) is oriented in a widthwise direction of the vehicle in order to make it possible to ensure a larger bank angle. Furthermore, since the motor output shaft is arranged further forward than the axle 68 it is possible to shorten the length in a longitudinal direction of the vehicle.

As has been described above, in the hybrid vehicle according to an embodiment of the present invention, the starter clutch 40 is provided between the crankshaft 22 and the continuously variable transmission 23. When the rotational speed of the crank shaft 22 exceeds a specified value and is transmitted to the continuously variable transmission 23, the following effects are obtained. Specifically, a power transmission between the crankshaft 22 and the continuously variable transmission 23 is disengaged when the rotational speed of the engine falls below the specified value. Therefore, instead of a rear wheel dive by the engine 20 it becomes possible to drive the rear wheel using the drive motor 21b that generally has a large torque at low rotation. In this way it is possible to reduce a drive loss in a low rotational speed region. Also, when the rotational speed of the engine is low, such as when idling etc., a rotational force of the crankshaft 22 is not consumed by the continuously variable transmission 23 but is efficiently converted to electrical energy by the ACG starter motor 21a. Therefore, a generating efficiency of the ACG starter motor 21a is improved. Since the power transmission means 23 is not driven when waiting for traffic signals etc., it is possible to suppress the generation of friction.

In addition, with this embodiment, the starter clutch 40 and the drive motor 21b are arranged further outwards in a widthwise direction of the vehicle than the continuously variable transmission 23. Therefore, it is possible to expose the starter clutch 40 and the drive motor 21b to the outside by simply opening the transmission case 59 housing these components. As a result it is possible to improve maintainability and improve attachability. Also, the starter clutch 40 and the drive motor 21b are arranged at the same side with respect to the continuously variable transmission 23. Therefore, it is possible to narrow the dimension in the width direction compared to other arrangements as the continuously variable transmission is enclosed. The starter clutch 40 is arranged close to the cooling air intake ports 59a formed in the transmission case 59. Therefore, it is possible to efficiently forcibly cool the starter clutch 40 using external air taken into the transmission case from the cooling air intake ports 59a, and cooling capability of the starter clutch 40 is improved. In addition, the starter clutch 40 and the drive motor 21b are arranged on the opposite side to the ACG starter motor 21a sandwiching the continuously variable transmission 23. Therefore, the starter clutch 40 and the drive motor 21b arranged on the same side with respect to the continuously variable transmission 23, and the ACG starter motor 21a which is heavy compared to the starter clutch 40 and the drive motor 21b, are split in a widthwise direction of the vehicle (left-right direction) of the continuously variable transmission 23.

In addition to the above, with this embodiment, by providing the one-way clutch 44 that is capable of transmitting a drive force in one direction from the continuously variable transmission 23 to the driven shaft 60 between the continuously variable transmission 23 and the driven shaft 60, power transmission from the driven shaft 60 side to the engine 20 side is always disengaged. Therefore, when shifting to a regenerative drive to the drive motor 21b from the rear wheel WR, as well as the fact that the above described disengaging operation is not necessary, the drive force transmitted from the rear wheel WR to the drive motor 21b is not consumed by the continuously variable transmission 23 at the time of regeneration. Therefore, recharge efficiency is improved. Also, at the time of switching from a state where the drive source is only the engine 20 to a state where the drive source is only the drive motor 21b, it is no longer necessary to have a drive source switching operation and power transmitted from the drive motor 21b to the rear wheel WR when traveling using only the drive motor 21b is consumed by drive of the continuously variable transmission 23. Therefore, it is possible to improve energy transmission efficiency. Also, since the one-way clutch 44 is used as unidirectional power transmission means, it is possible to reduce the size of the power unit 11 even if a centrifugal clutch is used.

The drive motor 21b is configured as an inner rotor type, and the one-way clutch 44 is arranged at an inner part of the inner rotor 80. Therefore, it is possible to effectively utilize dead space arising at the inner part even if the inner rotor 80 is unavoidably made large due to specification requirements etc., and it is possible to reduce the size of the power unit 11. In addition, the continuously variable transmission 23 is arranged close to the spring 64 urging the driven side movable pulley half body 62b in a widthwise direction of the vehicle. Therefore, it is also possible to make effective use of dead space likely to occur in the vicinity of the spring 64, and it is possible to reduce the size of the power unit 11.

In addition, with this embodiment, the fan 54b is connected to the crankshaft 22, and the drive motor 21b and the fan 54b are arranged inside the transmission case 59 at the same side with respect to the continuously variable transmission 23, as a result of which the fan 54b rotates together with the crankshaft 22, and a swirling current is generated inside the transmission case 59 as a result of this rotation. It is therefore possible to efficiently cool the drive motor 21 that has a large heat dissipation. It is also possible to forcibly control the drive motor 21b, even when there is no traveling wind such as at the time of idling when waiting for traffic signals or the like. Also, as well as the fact that the drive motor 21b is attached to the inner wall 59A of the transmission case 59 and cooling efficiency is improved because heat generated from the drive motor 21b is conveyed directly to the case outer surface and cooled by traveling wind, it is possible to carry out cooling utilizing swirling flow generated inside the transmission case 59 by the fan 54b. Therefore, it is possible to improve cooling capability of the drive motor 21b. Also since the cooling fins 59B are provided on the drive motor attachment section outer surface of the transmission case 59, it is possible to further improve the cooling capability using traveling wind.

In addition to the above, since with this embodiment the drive motor 21b is attached to the reduction gear mechanism 69, that is, the driven shaft 60, it is possible to reduce and transmit power from the drive motor 21b to the rear wheel 69 using the reduction gear mechanism provided between the continuously variable transmission 23 and the rear wheel WR. Therefore, compared to a motor direct type power unit where the drive motor 21b is directly connected to the axle 68 and the reduction gear mechanism is not provided between the continuously variable transmission 23 and the rear wheel WR, the following effects can be obtained. Specifically, though generated power of the drive motor 21b is the same in both units, even in cases where the speed of the drive motor 21b must be finally reduced, it is not necessary to add a new reduction gear mechanism between the continuously variable transmission 23 and the rear wheel WR, and it is possible to prevent an increase in the number of parts. On the other hand, when power finally transmitted to the rear wheel WR is shared, it is possible to further reduce the size of the drive motor 21b.

In addition to the above described structure, the drive motor 21b is arranged at the opposite side to the reduction gear mechanism 60 sandwiching the continuously variable transmission 23. Therefore, the drive motor 21b and reduction gear mechanism 69, which are heavy, are divided in a widthwise direction (left-right direction) of the continuously variable transmission 23. Since the drive motor 21b is arranged higher than the line L connecting the crankshaft 22 and the axle 68, looking from the side of the vehicle, the drive motor 21b of a hybrid vehicle, which tends to be large, is positioned higher up, and for a two-wheeled vehicle the drive motor 21b is arranged so that a longitudinal direction of the motor output shaft (driven shaft 60) is oriented in a widthwise direction of the vehicle in order to make it possible to ensure a larger bank angle, and since the motor output shaft is arranged further forward than the axle 68 it is possible to shorten the length in a longitudinal direction of the vehicle.

The present invention is by no means limited to each of the above embodiments and various design modifications are possible providing such modifications do not deviate from the spirit of the present invention. For example, the present invention is not limited to a two-wheeled vehicle; the present invention can also be applied to other moving bodies such as three or four wheeled vehicles. Also, with the above-described embodiments, a belt converter (continuously variable transmission 23) is used as the power transmission means, but other gearing mechanisms are also possible. The attachment position of the drive motor 21b is not limited to the rear wheel, and can also be the front wheel WF. It is also possible to connect the drive motor 21b to the middle shaft 73 of the reduction gear mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit structure for a hybrid vehicle, comprising:
an engine;
a crankshaft connected to the engine;
a power transmission device, said power transmission device transmitting a rotational force of the crankshaft connected to the engine to a drive wheel side;
a power engage/disengage device located between the crankshaft and the power transmission device, said power engage/disengage device transmitting a rotation force of the crankshaft to the power transmission device when the rotational speed of the crankshaft exceeds a specified value;
a drive shaft connected to a driven side of the power transmission device;
a one-way clutch located between the power transmission device and the drive shaft;
a reduction gear mechanism, said reduction gear mechanism reducing a rotational force of the drive shaft and transmitting the reduced rotational force to the drive wheel; and
a motor, said motor transmitting power to the drive wheel and being attached to the reduction gear mechanism.

2. The power unit structure for a hybrid vehicle according to claim 1, wherein the motor is connected to the drive shaft.

3. The power unit structure for a hybrid vehicle according to claim 1, wherein the motor is arranged opposite the reduction gear mechanism to locate the power transmission device between the motor and the reduction gear mechanism.

4. The power unit structure for a hybrid vehicle according to claim 1, wherein the hybrid vehicle is a two-wheeled vehicle, and a center point of the motor is arranged further up than a line connecting the crankshaft and the drive wheel, looking from the side of the vehicle.

5. The power unit structure for a hybrid vehicle according to claim 1, wherein the motor is arranged at an outer side in the widthwise direction of the vehicle with respect to the power transmission device.

6. The power unit structure for a hybrid vehicle according to claim 1, wherein the longitudinal direction of an output shaft of the motor is oriented in the widthwise direction of the vehicle, and the motor output shaft is arranged further to the front of the vehicle than the drive shaft.

7. A power unit for a hybrid vehicle, comprising:
an engine;
a crankshaft connected to the engine;
a power transmission device, said power transmission device transmitting a rotational force of the crankshaft connected to the engine to a drive wheel side;
a drive shaft connected to a driven side of the power transmission device and also connected to the drive wheel;
a motor connected to the drive shaft and functioning as at least an electrical generator;
a unit case, said unit case housing the power transmission device and the motor; and
a fan mounted on an end of the crankshaft,
wherein the motor and the fan are arranged inside the unit case together at the same side with respect to the power transmission device.

8. The power unit for a hybrid vehicle according to claim 7, wherein a power engage/disengage device is provided between the crankshaft and the power transmission device, said power engage/disengage device transmitting a rotation force of the crankshaft to the power transmission device when the rotational speed of the crankshaft exceeds a specified value.

9. The power unit for a hybrid vehicle according to claim 7, wherein the motor is attached to the unit case.

10. The power unit for a hybrid vehicle according to claim 7, wherein the motor is attached to an inner wall of the unit case.

11. The power unit for a hybrid vehicle according to claim 9, wherein cooling fins are provided on a motor attachment section outer surface of the unit case.

12. A power unit for a hybrid vehicle, comprising:
   an engine;
   a first motor connected to a crankshaft of the engine and functioning as a starter motor and an electrical generator;
   a power transmission device, said power transmission device transmitting rotational force of the crankshaft to a drive wheel side;
   a drive shaft connected to a driven side of the power transmission device and also connected to the drive wheel;
   a one-way clutch located between the power transmission device and the drive shaft;
   a second motor connected to the drive shaft and functioning at least as a motor; and
   a power engage/disengage device, provided between the crankshaft and the power transmission device, said power engage/disengage device transmitting rotational force of the crankshaft to the power transmission device when the rotational speed of the crankshaft exceeds a specified value.

13. The power unit for a hybrid vehicle according to claim 12, wherein the power engage/disengage device is arranged more to the outer side, in a widthwise direction of the vehicle, than the power transmission device.

14. The power unit for a hybrid vehicle according to claim 12, wherein air intake ports are provided in a transmission case housing the power transmission device, and the power engage/disengage device is arranged close to the air intake ports.

15. The power unit for a hybrid vehicle according to claim 12, wherein the power engage/disengage device and the second motor are arranged opposite the first motor to locate the power transmission device between the first motor and both the power engage device and second motor.

* * * * *